(12) United States Patent
Xie et al.

(10) Patent No.: US 11,530,344 B2
(45) Date of Patent: Dec. 20, 2022

(54) REACTIVE HOT MELT ADHESIVE COMPOSITION AND USE THEREOF

(71) Applicant: Henkel AG & Co. KGaA, Duesseldorf (DE)

(72) Inventors: Dan Xie, Shanghai (CN); Dongmei Shen, Shanghai (CN); Xiao Han, Shanghai (CN); Claudia Meckel-Jonas, Duesseldorf (DE); Xueyu Qiu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 816 days.

(21) Appl. No.: 16/405,179

(22) Filed: May 7, 2019

(65) Prior Publication Data

US 2019/0264078 A1    Aug. 29, 2019

Related U.S. Application Data

(63) Continuation of application No. PCT/CN2016/105331, filed on Nov. 10, 2016.

(51) Int. Cl.

| | | |
|---|---|---|
| *C09J 175/06* | (2006.01) | |
| *B32B 37/12* | (2006.01) | |
| *C08G 18/20* | (2006.01) | |
| *C08G 18/36* | (2006.01) | |
| *C08G 18/42* | (2006.01) | |
| *C08G 18/48* | (2006.01) | |
| *C08G 18/62* | (2006.01) | |
| *C08G 18/76* | (2006.01) | |
| *C09J 5/06* | (2006.01) | |
| *C08G 18/66* | (2006.01) | |
| *C08G 18/40* | (2006.01) | |
| *C09J 133/10* | (2006.01) | |

(52) U.S. Cl.
CPC ......... *C09J 175/06* (2013.01); *B32B 37/1207* (2013.01); *C08G 18/2081* (2013.01); *C08G 18/36* (2013.01); *C08G 18/4018* (2013.01); *C08G 18/4063* (2013.01); *C08G 18/4202* (2013.01); *C08G 18/4238* (2013.01); *C08G 18/4825* (2013.01); *C08G 18/6225* (2013.01); *C08G 18/6629* (2013.01); *C08G 18/7671* (2013.01); *C09J 5/06* (2013.01); *C09J 133/10* (2013.01); *B32B 2037/1215* (2013.01); *C08G 2170/20* (2013.01); *C09J 2475/00* (2013.01)

(58) Field of Classification Search
CPC . C09J 175/06; C09J 5/06; C09J 133/10; C09J 2475/00; C09J 175/08; C09J 11/06; C09J 11/08; C09J 133/08; C09J 2301/304; B32B 37/1207; B32B 2037/1215; C08G 18/2081; C08G 18/36; C08G 18/4018; C08G 18/4063; C08G 18/4202; C08G 18/4238; C08G 18/4825; C08G 18/6225; C08G 18/6629; C08G 18/7671; C08G 2170/20

See application file for complete search history.

(56) References Cited

U.S. PATENT DOCUMENTS

| | | | |
|---|---|---|---|
| 7,025,853 | B2 | 4/2006 | Kesselmayer |
| 7,955,471 | B2 | 6/2011 | Kesselmayer |
| 8,349,123 | B2 | 1/2013 | Zhang et al. |
| 8,664,330 | B2 | 3/2014 | Hung et al. |
| 8,933,163 | B2 | 1/2015 | Krebs et al. |
| 2004/0194881 | A1 | 10/2004 | Hung et al. |
| 2005/0033004 | A1 | 2/2005 | Hoffmann et al. |
| 2006/0084755 | A1 | 4/2006 | Good et al. |
| 2013/0122287 | A1 | 5/2013 | Moeller et al. |
| 2015/0361317 | A1* | 12/2015 | Janowicz ............... C08G 18/10 |
| | | | 156/331.7 |

FOREIGN PATENT DOCUMENTS

| | | |
|---|---|---|
| CN | 1550533 A | 12/2004 |
| CN | 1775887 A | 5/2006 |
| CN | 1269928 C | 8/2006 |
| CN | 102115518 A | 7/2011 |
| CN | 102781992 A | 11/2012 |
| CN | 102977838 A | 3/2013 |
| CN | 103087669 A | 5/2013 |
| CN | 103124756 A | 5/2013 |
| CN | 105367736 A | 3/2016 |
| EP | 2261272 A2 | 12/2010 |
| JP | 2004339469 A | 12/2004 |
| JP | 2007524778 A | 8/2007 |
| JP | 2007525546 A | 9/2007 |
| JP | 2011518239 A | 6/2011 |
| JP | 2012241182 A | 12/2012 |
| JP | 2013241610 A | 12/2013 |
| JP | 2015101699 A | 6/2015 |
| WO | 2016000222 A1 | 1/2016 |
| WO | 2016025821 A1 | 2/2016 |

OTHER PUBLICATIONS

International Search Report for International PCT Patent Application No. PCT/CN2016/105331 dated Aug. 17, 2017.
EN ISO 2555.

\* cited by examiner

*Primary Examiner* — Daniel H Lee
(74) *Attorney, Agent, or Firm* — James E. Piotrowski

(57) ABSTRACT

The present invention relates to a reactive hot melt adhesive composition, a polyurethane prepolymer composition, and cured reaction product thereof having a high mechanical strength and an excellent bonding strength as well as a better reworkability. In particular, the present invention relates to a reactive hot melt adhesive composition comprising: 10% to 24% by weight of a polyisocyanate, 40% to 73% by weight of a first polyol having a number average molecular weight larger than 1,500 g/mol, 1% to 25% by weight of a (meth)acrylate polymer having a number average molecular weight of 20,000 to 80,000 g/mol, and 1% to 15% by weight of a diluent, in which the weight percentages are based on the total weight of all components of the composition.

25 Claims, No Drawings

REACTIVE HOT MELT ADHESIVE COMPOSITION AND USE THEREOF

TECHNICAL FIELD

This invention relates to a reactive hot melt adhesive composition and use thereof. In particular, the invention relates to a reactive hot melt adhesive composition, a polyurethane prepolymer composition, and cured product thereof, which possesses a high mechanical strength and an excellent bonding strength as well as a better reworkability.

BACKGROUND OF THE INVENTION

Reactive polyurethane hot melt adhesive is notable for a very high performance profile. These adhesives have therefore increasingly conquered new industrial applications in recent years. However, many traditional reactive polyurethane hot melt adhesives exhibit poor tractability after curing, which limits their use in various applications for which repairability or reworkability achieved by the adhesives are highly desired. For instance, more and more manufacturers in handheld device industry are requiring the reworkability of device assembly bonded by hot melt adhesives so that the expensive parts of the assembly can be reused and thus the cost can be significantly saved. In addition, a minimum duration of thermal treatment of the device containing the adhesive bonded between substrates for achieving the reworking is desired.

There have been several attempts to improve the reworkability for a reactive polyurethane hot melt adhesive. For example, CN 105367736 A proposes a two-stage process for preparing a polyurethane hot melt. In the first step, a hydroxyl-terminated polyurethane prepolymer is obtained by reaction of polyether polyol, OH functionalized liquid rubber, diisocyanate, as well as alcohol block agent. The second step is carried out in the resultant prepolymer by mixing a prepolymer containing isocyanate groups wherein excess isocyanates reacts with polyols. This hot melt adhesive is said to have the characteristics of reworkability by heat, and exhibit flexibility and anti-aging property. However, the two-stage preparation results in a complicated production procedure.

WO 2016/025821 A1 discloses a prepolymer composition that can be prepared by reacting a first crystalline polyester polyol having a number average molecular weight of from at least 5500 to about 20,000 g/mol and a melting point of at least 40° C., and a polyisocyanate. It is said that the polyurethane adhesive composition can be easily and cleanly removed from the bonded substrate at the temperature of from at least 60° C. to no great than 100° C. for about 30 min, which significantly extends the working process.

WO 2016/00222 A1 discloses a polyurethane reactive hot melt adhesive comprising a (meth)acrylate polymer and an isocyanate-functional polyurethane prepolymer, wherein the (meth)acrylate polymer has a melting point of from about 90 to about 140° C., and a number average molecular weight of from about 20,000 to about 80,000 g/mol. It is said that this adhesive has good reworkability after 24 hours curing and a 30 min thermal treatment, good bonding strength and excellent impact resistance. However, the thermal treatment for reworking is relatively long and not satisfactory.

Thus, there is still a need for a reactive hot melt adhesive composition that can improve the reworkability and maintain an excellent performance profile of bonding. In particular, the present invention provides a reactive hot melt adhesive composition that contributes to a good mechanical strength on various substrates for the polyurethane prepolymer thereof, results in an excellent bonding strength for the cured product thereof, significantly shortens the duration of thermal treatment for the reworking of assembly, and provides with the ease to apply the polyurethane prepolymer.

SUMMARY OF THE INVENTION

The present invention provides a reactive hot melt adhesive composition, comprising:
(1) about 10% to about 24% by weight of a polyisocyanate,
(2) about 40% to about 73% by weight of a first polyol having a number average molecular weight larger than about 1,500 g/mol,
(3) about 1% to about 25% by weight of a (meth)acrylate polymer having a number average molecular weight of about 20,000 to about 80,000 g/mol, and
(4) about 1% to about 15% by weight of a diluent, in which the weight percentages are based on the total weight of all components of the composition.

The present invention also provides a polyurethane prepolymer composition comprising the reaction product of the reactive hot melt adhesive composition according to the present invention.

Furthermore, the present invention provides a method of bonding materials together which comprises applying the polyurethane prepolymer composition according to the present invention in a liquid form to a first substrate, bringing a second substrate in contact with the composition applied to the first substrate, and subjecting the adhesive to moisture which will allow the composition to cool and cure to a solid form.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In one aspect, the present invention provides a reactive hot melt adhesive composition, comprising:

(1) about 10% to about 24% by weight of a polyisocyanate,
(2) about 40% to about 73% by weight of a first polyol having a number average molecular weight larger than 1,500 g/mol,
(3) about 1% to about 25% by weight of a (meth)acrylate polymer having a number average molecular weight of about 20,000 to about 80,000 g/mol, and
(4) about 1% to about 15% by weight of a diluent, in which the weight percentages are based on the total weight of all components of the composition.

It has been surprisingly found that the reactive hot melt adhesive composition according to the present invention provides a viscosity suitable to be dispensed or applied to the polyurethane prepolymer composition, and allows for an improved reworkability and excellent mechanical and bonding behavior of the cured adhesive product.

Polyisocyanate

Polyisocyanate used in the present invention is any organic compound having an average of more than one isocyanate group, or combination of such compounds. Polyisocyanates include hydrocarbon diisocyanates or substituted hydrocarbon diisocyanates, such as p-phenylene diisocyanate (PPDI), biphenyl 4,4'-diisocyanate, toluene diisocyanate (TDI), 3,3'-dimethyl-4,4'-biphenylene diisocyanate, 1,4-tetramethylene diisocyanate, 1,6-hexamethylene diisocyanate (HDI), 2,2,4-trimethylhexane-1,6-diisocyanate, diphenyl methane-4,4'-diisocyanate (MDI), 1,5-naphthalene diisocyanate (NDI), tolidene disiocyanate (TODD, cyclohexanediisocyanate (CHDI), bis(isocyanatomethyl)cyclohexane, bis(isocyanatoethyl fumarate), isophorone diisocyanate (IPDI), methylene-bis-(4 cyclohexylisocyanate). While diisocyanates are preferred, other multi-functional isocyanates can be utilized. Examples are 1,2,4-benzene triisocyanate and polymethylene polyphenyl isocyanate (PMDI). Mixtures of the polyisocyanates are optionally used. Preferred polyisocyanate includes TDI, MDI, IPDI, PPDI, NDI, TODI, CHDI, H12MDI, HDI, HDI dimer, HDI trimer, or combination thereof. More preferred polyisocyanate is TDI, IPDI, HDI, MDI or combination thereof. In one embodiment, the polyisocyanate used in the reactive hot melt adhesive composition is MDI, commercially available under the trade name of Desmodur 44C from Bayer.

According to the present invention, the polyisocyanate is present in an amount of about 10% to about 24%, preferably about 12% to about 20%, more preferably 13% to 18% by weight based on the total weight of all components of the composition.

If the amount of polyisocyanate is higher than the above range, a good reworkability may not be achieved. If the amount is too low, less isocyanate group will be contained in the prepolymer composition and bonding strength of the cured product will be deteriorated.

First Polyol

The first polyol used in the reactive hot melt adhesive composition is the main component reactive with polyisocyanate to produce a polyurethane or polyurea prepolymer having isocyanate groups. The first polyol has a number average molecular weight larger than about 1,500 g/mol, preferably larger than about 2,000 g/mol, more preferably from about 2,000 g/mol to about 5,0000 g/mol, in particular from about 2,000 g/mol to about 1,0000 g/mol as determined by gel permeation chromatography (GPC) method. The first polyol is different to the second polyol used as diluent in the composition.

The first polyol used in the present invention includes polyether polyol (substituted or unsubstituted polyalkylene ether polyol), polyester polyol, the ethylene or propylene oxide adducts of polyols and the monosubstituted esters of glycerol, and "polymer polyols" (i.e., graft polyols containing a proportion of a vinyl monomer, polymerized in situ) as well as mixtures thereof. While such compounds are commercially available, methods for synthesizing such compounds are well known in the art. In one embodiment of the present invention, the first polyol is selected from polyester polyol, polyether polyol, and mixture thereof.

Suitable polyether polyols include linear and/or branched polyethers having plural numbers of ether bonds and at least two hydroxyl groups, and contain substantially no functional group other than the hydroxyl groups. Examples of the polyether polyol may include polyoxyalkylene polyol such as polyethylene glycol, polypropylene glycol, polytetramethylene glycol, polybutylene glycol and the like. Further, a homopolymer and a copolymer of the polyoxyalkylene polyols or mixtures thereof may also be employed. Particularly preferable copolymers of the polyoxyalkylene polyols may include an adduct of at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine; with at least one compound selected from the group consisting of ethylene oxide, propylene oxide and butylene oxide. While such polyether polyols are commercially available, methods for synthesizing such polyether polyols are well known in the art. Non-limiting examples of commercially available polyols which may be used in the practice of the invention include Voranol 2120 (Dow Chemicals), ARCOL PPG 2025 (Bayer), PolyG 20-56 (Arch) and Pluracol P-2010 (BASF).

Suitable polyester polyols may be formed from the condensation of one or more polyhydric alcohols having from about 2 to about 15 carbon atoms with one or more polycarboxylic acids having from about 2 to about 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol, 1,4-cyclohexanediol, 1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing about 14 or less carbon atoms and the aromatic dicarboxylic acids containing about 14 or less carbon atoms. While such polyester polyols are commercially available, methods for synthesizing such polyester polyols are well known in the art. Commercially available polyester polyols useful in the invention include, for example, Dynacoll 7130, 7210, 7240, and 7360 (Evonik), Fomrez 66-32 (Crompton) and Rucoflex S-105-30 (Bayer).

In one embodiment, the first polyester is a mixture of one or more polyester polyols and one or more polyether polyols.

According to the present invention, the first polyol is present in an amount of about 40% to about 73%, preferably about 50% to about 70%, more preferably about 60% to about 70% by weight based on the total weight of all components of the composition.

If the amount of first polyol is higher than the above range, a good reworkability may not be achieved. If the amount is too low, the viscosity of the prepolymer composition will be low so that the spreading of adhesive on the substrate may be out of control.

(Meth)Acrylate Polymer

The (meth)acrylate polymer used in the reactive hot melt adhesive composition has a number average molecular weight of from about 20,000 g/mol to about 80,000 g/mol, preferably from about 25,000 to about 60,000 g/mol as determined by gel permeation chromatography (GPC) method. The (meth)acrylate polymer is different to the (meth)acrylate oligomer used as diluent in the composition.

The first poly(meth)acrylate may have a Tg values of between about −48° C. and about 105° C., more preferably about −20° C. to about 85° C. and more preferably about 15° C. to about 85° C. Tg value refers to glass transition temperature which is the temperature point corresponding to the peak value of the tan delta curve in a dynamic mechanical analysis (DMA) measurement. The temperature corresponding to the peak of the tan delta curve is taken as the glass transition temperature (Tg) of the first poly(meth)acrylate. The first poly(meth)acrylate comprises or is composed of copolymerized alkyl (meth)acrylic monomers. Suitable monomers include the Ci to $C_{12}$ esters of methacrylic and acrylic acids including, but not limited to methyl methacrylate, ethyl methacrylate, n-propyl methacrylate, iso-propyl methacrylate, n-butyl methacrylate, isobutyl methacrylate, n-hexyl methacrylate, n-octyl methacrylate, 2-ethylhexyl methacrylate, dodecyl(lauryl) methacrylate, cyclohexylmethacrylate, norbornyl methacrylate or the corresponding acrylates. Mixtures of compatible (meth)acrylate monomers may, also be used. Methacrylic and acrylic comonomers based on esters of methacrylic and acrylic acid with poly(ethylene glycol) and/or poly(propylene glycol and/or glycol ethers may also be used.

Functional monomers may also be used in the poly(meth) acrylate, e.g., acid, amine, hydroxyl or epoxy functional (meth)acrylic comonomers although this list is not exclusive. Hydroxyl containing (meth)acrylic polymers are preferred. Suitable hydroxyl functional monomers that can be incorporated into the (meth)acrylic polymer include, but are not limited to, 2-hydroxyethylmethacrylate, 2-hydroxy propyl methacrylate and 2-hydroxybutyl methacrylate or the corresponding acrylates. Suitable acid functional monomers that can be incorporated into the (meth)acrylic polymer include, but are not limited to, methacrylic acid and acrylic acid. Suitable amine-functional monomers include, but are not limited to, dimethylaminoethyl methacrylate, diethylaminoethyl methacrylate or the corresponding acrylates.

Virtually any ethylenically unsaturated monomer may be utilized as the monomer in the first (meth)acrylic polymer. Other additional vinyl comonomers that may be used include the vinyl esters (e.g., vinyl acetate and vinyl propionate); vinyl ethers; esters of crotonic acid, maleic acid, fumaric acid and itaconic acid, styrene, alkyl styrenes, acrylonitrile, butadiene.

In one embodiment, the (meth)acrylate polymer is a reaction product of the monomer selected from the group consisting of methyl (meth)acrylate, ethyl (meth)acrylate, n-propyl (meth)acrylate, iso-propyl (meth)acrylate, n-butyl (meth)acrylate, isobutyl (meth)acrylate, n-hexyl(meth)acrylate, n-octyl(meth)acrylate 2-ethylhexyl (meth)acrylate, dodecyl (meth)acrylate, cyclohexyl (meth)acrylate, norbornyl(meth)acrylate and combination thereof.

According to the present invention, the (meth)acrylate polymer is present in an amount of about 1% to about 25%, preferably about 2% to about 20%, and more preferably about 5% to about 15% by weight based on the total weight of all components of the composition.

If the amount of (meth)acrylate polymer is higher than the above range, a viscous adhesive composition will be obtained and is difficult to be applied or dispensed. If the amount is too low, the viscosity of the adhesive composition will be low so that the spreading of adhesive on the substrate may be out of control.

Diluent

The reactive hot melt adhesive composition in the present invention further comprises a diluent. The term "diluent" means a product has the capacity to dissolve and/or lower the viscosity of the composition into which it is added. The inventors have surprisingly found that by adding the diluent into the reactive hot melt adhesive composition according to the present invention, the reworkability of the cured product produced by the adhesive composition can be significantly improved with an excellent balance of bonding strength and aging property.

According to the present invention, the diluent is selected from the group consisting of a (meth)acrylate oligomer having a number average molecular weight of about 1,000 to about 15,000 g/mol, a second polyol having a number average molecular weight of no larger than about 1,200 g/mol, and combination thereof.

The (meth)acrylate oligomer is a liquid (meth)acrylate oligomer, and have a Tg value of no larger than about 0° C. The (meth)acrylate oligomer may have (meth)acrylic repeat units made from monofunctional acrylic monomers. The (meth)acrylate oligomer can be substantially water-insoluble and derived from (meth)acrylate monomers. Preferably, the (meth)acrylate oligomer has a number average molecular weight of from about 1,500 to about 10,000 g/mol, more preferably from about 3,000 to about 9,000 g/mol.

Suitable (meth)acrylate oligomer include copolymers of n-butyl (meth)acrylate and allyl monopropoxylate, n-butyl (meth)acrylate and allyl alcohol, n-butyl (meth)acrylate and hydroxyethyl (meth)acrylate, n-butyl (meth)acrylate and hydroxylpropyl (meth)acrylate, 2-ethylhexyl (meth)acrylate and allyl propoxylate, 2-ethylhexyl (meth)acrylate and hydroxypropyl (meth)acrylate, and mixtures thereof.

Exemplary commercial (meth)acrylate oligomer useful in the reactive hot melt adhesive composition are those having the tradename JONCRYL (available from BASF), ACTFLOW (available from Soken Chemical & Engineering) and ARUFON (available from Toagosei Co., Ltd).

The second polyol having a number average molecular weight of no larger than about 1,200 g/mol, preferably about 500 to about 1,200 g/mol may be used as the diluent in the present reactive hot melt adhesive composition.

Preferably, the second polyol is a natural oil based polyol. The term "natural oil" is used herein to refer to animal and vegetable oils, preferably vegetable oils. Examples of vegetable and animal oils include, but are not limited to, castor oil, soybean oil, safflower oil, linseed oil, corn oil, sunflower oil, olive oil, canola oil, sesame oil, cottonseed oil, palm oil, rapeseed oil, tung oil, fish oil, or a blend of any of these oils.

The term "natural oil based polyol" is used herein to refer to natural oil polyol compounds which are derived from natural oils. For instance, natural oils or isolates therefrom are reacted with compounds ranging from air or oxygen to organic compounds including amines and alcohols. Frequently, unsaturation in the natural oil is converted to hydroxyl groups or to a group which can subsequently be reacted with a compound that has hydroxyl groups such that a polyol is obtained. In particular, the natural oil based polyol is selected from the group consisting of a castor oil based polyol, a dimer fatty acid based polyol, and combination thereof.

Suitable castor oil based polyols are those having primary and/or secondary hydroxyl groups, a hydroxyl value of about 50 to about 400 mg KOH/g, preferably about 100 to about 250 mg KOH/g, a viscosity of about 100 to about 2,000 cPs, preferably about 300 to about 1,500 cPs at 25° C. These castor oil based polyols may be generated by reacting fatty acids having at least one hydroxyl group onto the castor oil molecule. Commercial examples of such product are castor oil based polyols under the trade name of Polycin series available from Vertellus Specialties Inc.

The dimer fatty acid based polyol is a polyol prepared from at least one dimer fatty acid or derivative thereof, preferably from the dimer fatty acid or ester or a combination thereof. Examples of the dimer fatty acid includes but not limited to ricinoleic acid, oleic acid, linoleic acid, linolenic acid, stearic acid, palmitic acid, or dihydroxystearic acid, which are obtained from natural oils. The dimer fatty acids can be products having the dimerization product of one or more mono- or poly-unsaturated fatty acids as the principal constituent thereof. The dimer fatty acids normally contain a percentage of trimer fatty acids and a relatively small percentage of monofunctional fatty acids.

Advantageously, the dimer fatty acid based polyol has a hydroxyl value of about 20 to about 200 mg KOH/g, and preferably about 100 to about 150 mg KOH/g as determined by ASTM E-222-67, Method B.

Suitable commercially available dimer fatty acid based polyol includes, e.g., dimer acid-based polyester polyols available under the trade name of Priplast series available from Croda.

According to the present invention, the diluent is present in an amount of about 1% to about 15%, preferably about 2% to about 12%, more preferably about 3% to about 10% by weight based on the total weight of all components of the composition.

If the amount of diluent is higher than the above range, the mechanical strength and bonding strength and/or the aging property may not be acceptable. If the amount is too low, the heated cured product cannot be easily peeled off from the substrates and adhesive residue will remain on the substrate.

Other additives inert to the other components comprised in the reactive hot melt adhesive composition according to the present invention and conventionally used in the art of hot melt adhesives to satisfy different properties and meet specific application requirements can optionally be included from 0% by weight to about 20% by weight in the reactive hot melt adhesive composition of the present invention. Such additives include, for example, thermoplastic polymers, plasticizers, fillers, pigments, curing catalysts, dissociation catalysts, anti-oxidants, flow modifiers, dyestuffs, flame retardants, inhibitors, UV absorbers, adhesion promoters, stabilizers, tackifiers and waxes which may be incorporated in minor or larger amounts into the adhesive formulation, singly or in combination, depending on the purpose.

The reactive hot melt adhesive composition of the present invention optionally contains from 0 to about 50% by weight, preferably 5 to about 35% by weight a thermoplastic polymer which cooperates with the other adhesive composition components to provide the desired properties of the cured adhesive products according to the present invention. Preferably, the thermoplastic polymer is selected to be of similar polarity and compatible with first polyol, isocyanate, (meth)acrylate polymer, diluent and other optional components like tackifier or plasticizer. The preferred optional thermoplastic polymers include polyurethanes, homopolymers or random copolymers of olefinic monomers including but not limited to, (meth)acrylic acid, vinyl esters (vinyl acetate and vinyl propionate), vinyl ethers, styrene, acrylamides, methacrylamides, fumarates, maleates, acrylonitrile, ethylene, propylene and derivatives thereof. Most preferred are homopolymers or random copolymers of ethylene, propylene, vinyl esters and derivatives thereof. Suitable commercially available thermoplastic polymers include but not limited to Pearlbond TPU series from Lubricant and Evatane series from Arkema.

The reactive hot melt adhesive composition of present invention optionally comprise a catalyst in an amount of from 0% by weight to about 2% by weight, more preferably from about 0.1% by weight to about 0.8% by weight, based on the total weight of all components of the composition. The optional catalysts may accelerate the formation of the reactive hot melt adhesive composition of present invention during its production and/or the moisture curing/crosslinking process after application. Suitable catalysts are the normal polyurethane catalysts such as, for example, compounds of divalent and tetravalent tin, more particularly the dicarboxylates of divalent tin and the dialkyl tin dicarboxylates and dialkoxylates. Examples of such catalysts are dibutyl tin dilaurate, dibutyl tin diacetate, dioctyl tin diacetate, dibutyl tin maleate, tin(II) octoate, tin(II) phenolate as well as the acetyl acetonates of divalent and tetravalent tin. The highly effective tertiary amines or amidines may also be used as catalysts, optionally in combination with the tin compounds mentioned above. Suitable amines are both acyclic and, in particular, cyclic compounds. Examples include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether (DMDEE) or dimethyl piperazine or even mixtures of the amines mentioned above.

In one particular embodiment of the present invention, the reactive hot melt adhesive composition of present invention comprises a reactive hot melt adhesive composition, comprising:
(1) about 12% to about 20%, preferably about 13% to about 18% by weight of a polyisocyanate,
(2) about 50% to about 70%, preferably about 60% to about 70% by weight of a first polyol having a number average molecular weight larger than about 1,500 g/mol,
(3) about 2% to about 20%, preferably about 5% to about 15% by weight of a (meth)acrylate polymer having a number average molecular weight of about 20,000 to about 80,000 g/mol, and
(4) about 1% to about 15%, preferably about 2% to about 12% by weight of a diluent, in which the weight percentages are based on the total weight of all components of the composition.

In another aspect, the present invention also concerns a polyurethane prepolymer composition comprising of or consisting of the reaction product of the reactive hot melt adhesive composition. The term "reaction product" will be understood in a broad sense, and refers to the mixture of unreactive components such as catalyst, unreactive diluent, (meth)acrylate polymer, and product of reactive components including the polyisocyanate, the first polyol and other component such as reactive diluent which is involved in the reaction and incorporated into the polyurethane prepolymer. In one embodiment, the reaction product consists of a product of polyisocyanate, first polyol, reactive diluent (e.g. the second polyol having a small molecule weight), and other unreactive components. In another embodiment, the reaction product consists of a product of polyisocyanate, first polyol and other unreactive components such as unreactive diluent (e.g. the (meth)acrylate oligomer).

While the choice of components, order of addition, and addition rate can be left to the skilled practitioner in adhesive art. Generally polyurethane prepolymer composition prepared from the reactive hot melt adhesive composition of this invention can be made by preparing the (meth)acrylate polymer diluent and the first polyol and blending other ingredients such as thermoplastic polymer, catalyst or tackifier, if necessary, into a suitable reaction vessel at elevated temperatures, typically in the range of about 60° C. to about 150° C., preferably about 80° C. to about 120° C. The isocyanate is then introduced into the reaction vessel at elevated reaction temperatures, typically in the range of about 80° C. to about 130° C. Moisture is typically excluded from reaction using dry chemicals and conducting the reaction under vacuum or the presence of an anhydrous gas blanket.

In another aspect, the present invention also provides a method for bonding articles together which comprises applying polyurethane prepolymer composition in a liquid form to a first substrate, bringing a second substrate in contact with the polyurethane prepolymer composition applied to the first substrate, and subjecting the polyurethane prepolymer composition to moisture which will allow the polyurethane prepolymer composition to cool and cure to a solid form. The polyurethane prepolymer composition is typically distributed and stored in its solid form, and is stored in the absence of moisture. When the polyurethane prepolymer composition is ready for use, the solid is heated and melted prior to application. Thus, this invention includes the polyurethane prepolymer composition in both its solid form, as it is typically to be stored and distributed, and its liquid form, after it has been melted, just prior to its application.

After application, to adhere articles together, the polyurethane prepolymer composition is subjected to conditions that will allow it to solidify and cure to a composition that has an irreversible solid form. Irreversible solid form means a solid form comprising the polyurethane composition extended from the aforementioned polyurethane prepolymer composition having isocyanate functions. The polyurethane prepolymer composition having the irreversible solid form typically can withstand temperatures of up to 150° C. Solidification (setting) occurs when the molten polyurethane prepolymer composition is cooled by subjected to room temperature. The polyurethane prepolymer composition of the present invention can be cured to an irreversible solid form in the bond line using a variety of mechanisms. The curing reaction occurs between a compound having an available active hydrogen atom and the NCO groups of polyurethane prepolymer. A variety of reactive compounds having free active hydrogens are known in the art including water, hydrogen sulfide, polyols, ammonia, and other active compounds. The preferred curing reaction of this invention relies on the presence of ambient moisture. In one embodiment, provided herein is a cured adhesive product obtained from the polyurethane prepolymer composition according to the present invention.

The polyurethane prepolymer composition and the cured adhesive product can be used for bonding articles having substrates made of wood, metal, polymeric plastics, glass and textiles, in the manufacture of footwear, as a glazing compound in the manufacture of windows, in the manufacture of doors and architectural panels, and in the manufacture of the handheld devices and displays (HHDD). In one embodiment, the reactive hot melt adhesive and the cured adhesive product according to the present invention are used in handheld devices and displays.

Not bound by any theory, the combined use of the diluent in the reactive hot melt adhesive composition and suitable selection of weight ratio of components results in an excellent reworkability and bonding strength for the cured adhesive product, and a high mechanical strength of polyurethane prepolymer composition prepared by the reactive hot melt adhesive composition.

According to the present invention, the cured adhesive product has a viscosity at 110° C. of about 3,000 to about 7,000 mPas, measured according to EN ISO 2555 by Brookfield Digital Viscometer RVT using spindle 27 at 10 rpm.

According to the present invention, the cured adhesive product has a tensile strength of from about 5 to about 20 Mpa, an elongation of from about 700% to about 2,000%, a modulus of from about 20 to about 50 Mpa, measured according to ASTM D882-02.

In addition, the cured adhesive product of the reactive hot melt adhesive composition can be removed from the bonded substrates without residue and break of adhesive under visual inspection by a thermal treatment at 80° C. for no longer than 10 minutes.

EXAMPLES

The following examples are intended to assist one skilled in the art to better understand and practice the present invention. The scope of the invention is not limited by the examples but is defined in the appended claims. All parts and percentages are based on weight unless otherwise stated.

The following tests were used to determine viscosity, mechanical strength, bonding strength and reworkability of the cured adhesive product.

Testing and Evaluation Methods

The viscosity the prepolymer compositions was measured by a Brookfield Digital Viscometer RVT with Thermosel heating unit, using spindle 27, at 110° C., at 10 rpm, according to EN ISO 2555.

The tensile strength, elongation and modulus the cured adhesive product were measured according to ASTM D882-02.

The bonding strength of the cured adhesive product between assembled substrates (stainless steel to glass; plastics made of polycarbonate (PC) and acrylonitrile-butadiene-styrene (ABS) (PC/ABS) to glass; and PC/ABS to PC/ABS) at room temperature were measured 24 hours after final curing according to conventional methods.

The bonding strength of the cured adhesive product between assembled substrates (stainless steel to glass; PC/ABS to glass; and PC/ABS to PC/ABS) after an aging of 3 days at 65° C. and 95% humidity were measured according to conventional methods.

The reworkability of assembly parts due to the cured adhesive product were tested and evaluated according to the method consisting of the following steps:

1. Keep the substrates (assembled substrates/parts) bonded by the cured adhesives for 72 hours under indoor atmosphere conditions;
2. Place the bonded substrates into an oven heated at 80° C. for 10 minutes, then get the substrates out of oven and cool down to room temperature;
3. Detach the substrates and try to peel off the adhesive left on the substrates by hand; and 4. Evaluate the reworkability by the following scales:

| Grade | Category | Description |
|---|---|---|
| 1 | Excellent reworkability | All of cured product can be very easily peeled off the substrates without break |
| 2 | Relatively easy to rework | All of cured product can be peeled off the substrates without break |
| 3 | Moderately difficult to rework | Part of cured product can be peeled off the substrates with less than 10% adhesive residue |
| 4 | Difficult to rework | Part of cured product can be peeled off the substrates with 10% to 30% adhesive residue |
| 5 | Very difficult to rework | Part of the adhesive can be peeled off the substrates, 50% or more than 50% adhesive residue |

Materials

Polyisocyanate:

Diphenyl methane-4,4'-diisocyanate (MDI), commercially available under the trade name of Desmodur 44C from Bayer.

(Meth)Acrylate Polymer:

A solid methacrylate copolymer bead resin with a number average molecular weight of 26,000 g/mol, an acid number of 5.2 mg KOH/g, and a hydroxyl number of 9.5 mg KOH/g, commercially available under the trade number of Elvacite 2903 from Lucite International Speciality.

Polyester Polyol 1:

A solid, partially crystalline, saturated copolyester with a number average molecular weight of 3,500 g/mol, an acid number of no larger than 2 mg KOH/g, and a hydroxyl number of 27 to 34 mg KOH/g, commercially available under the trade name of Dynacoll 7360 from Evonik Degussa.

Polyester Polyol 2:

A liquid, saturated copolyester with a number average molecular weight of 3,500 g/mol, an acid number of no larger than 2 mg KOH/g, and a hydroxyl number of 27 to 34 mg KOH/g, commercially available under the trade name of Dynacoll 7210 from Evonik Degussa.

Polyether Polyol:

A propylene glycol initiated polyol with a number average molecular weight of 2,000 g/mol, an acid number of no larger than 0.03 mg/g, and a hydroxyl number of 56 mg KOH/g, commercially available under the trade name of Voranol 2120 from Dow Plastics.

Catalyst:

2,2'-Dimorpholinodiethyl ether (DMDEE), commercially available under the trade name of Lupragen® N106 from BASF SE.

Diluent A-1:

A liquid (meth)acrylate polymer with a number average molecular weight of 8,000 g/mol, commercially available under the trade name of UP1171 from Toagosei Co., Ltd.

Diluent A-2:

A liquid (meth)acrylate polymer with a number average molecular weight of 6,000 g/mol, commercially available under the trade name of UH2190 from Toagosei Co., Ltd.

Diluent B-1:

A castor oil based polyol with a number average molecular weight of 700 g/mol, commercially available under the trade name of Polycin D140 from Vertellus Specialties Inc.

Diluent B-2:

A dimer fatty acid based polyester polyol with a number average molecular weight of 1,000 g/mol, commercially available under the trade name of Priplast 3162 from Croda.

Thermoplastic Polymer 1:

A linear, polycaprolactone-copolyester polyurethane, commercially available under the trade name of Pearlbond TPU 501 from Lubrizol Corporation.

Thermoplastic Polymer 2:

An ethylene-propylene copolymer, commercially available under the trade name of TB1403 from QIDA.

Thermoplastic Polymer 3:

A random copolymer of ethylene and vinyl acetate, commercially available under the trade name of Evatane 28-800 from Arkema.

Preparation

The reactive hot melt adhesive compositions having the formulations shown in Table 1 according to the present invention were prepared as Examples 1-9. All components except polyisocyanate were added into a heat vessel to melt and mixed by a stirrer until homogeneous. The mixture was dried under vacuum at 120° C. for 120 min. Then diphenyl methane 4,4'-diisocyanate was added and the reaction was allowed to initiated at 120° C. for 1 hour. If necessary, other additives were finally added and the resulting mixture was stirred at 100° C. for 10 min. The resulting polyurethane prepolymer composition was then placed into a container under a dry nitrogen headspace to prevent exposure to moisture. Comparative examples (CE.1-9) were also prepared in the same way except the presence of certain component and weight ratio and the formulations are listed in Table 2.

TABLE 1

Inventive formulations of reactive hot melt adhesive compositions according to the present invention (by weight %) and testing results

|  | Example 1 | Example 2 | Example 3 | Example 4 | Example 5 | Example 6 | Example 7 | Example 8 | Example 9 |
|---|---|---|---|---|---|---|---|---|---|
| Component |  |  |  |  |  |  |  |  |  |
| Polyester polyol 1 | 24.8 | 24.8 | 24.3 | 24.5 | 24.6 | 24.4 | 24.6 | 24.4 | 24.6 |
| Polyester polyol 2 | 19.3 | 19.3 | 18.9 | 19.1 | 19.2 | 19.0 | 19.2 | 19.0 | 19.2 |
| Polyether polyol | 25.4 | 25.4 | 24.9 | 25.1 | 25.2 | 25.0 | 25.2 | 25.0 | 25.2 |
| (Meth)acrylate polymer | 10.0 | 10.0 | 9.8 | 9.9 | 6.0 | 5.9 | 6.0 | 5.9 | 6.0 |
| Polyisocyanate | 13.8 | 13.8 | 15.7 | 14.8 | 14.4 | 15.2 | 14.4 | 15.2 | 14.4 |
| Catalyst | 0.1 | 0.1 | 0.1 | 0.1 | 0.1 | 0.1 | 0.1 | 0.1 | 0.1 |
| Diluent A-1 | 6.6 | 0.0 | 0.0 | 0.0 | 0.0 | 0.0 | 0.0 | 0.0 | 0.0 |
| Diluent A-2 | 0.0 | 6.6 | 0.0 | 0.0 | 4.0 | 0.0 | 4.0 | 0.0 | 4.0 |
| Diluent B-1 | 0.0 | 0.0 | 6.5 | 0.0 | 0.0 | 3.9 | 0.0 | 3.9 | 0.0 |

TABLE 1-continued

Inventive formulations of reactive hot melt adhesive compositions according to the present invention (by weight %) and testing results

| | Example 1 | Example 2 | Example 3 | Example 4 | Example 5 | Example 6 | Example 7 | Example 8 | Example 9 |
|---|---|---|---|---|---|---|---|---|---|
| Diluent B-2 | 0.0 | 0.0 | 0.0 | 6.5 | 0.0 | 0.0 | 0.0 | 0.0 | 0.0 |
| Thermoplastic polymer 1 | 0.0 | 0.0 | 0.0 | 0.0 | 6.6 | 6.5 | 0.0 | 0.0 | 0.0 |
| Thermoplastic polymer 2 | 0.0 | 0.0 | 0.0 | 0.0 | 0.0 | 0.0 | 6.6 | 6.5 | 6.6 |
| Physical properties | | | | | | | | | |
| Viscosity at 110° C. (mPas) | 4500 | 4650 | 5350 | 5500 | 6000 | 6100 | 6200 | 6150 | 4500 |
| Tensile strength (Mpa) | 5.48 | 5.97 | 6.55 | 6.35 | 9.56 | 9.46 | 9.72 | 9.66 | 6.55 |
| Elongation (%) | 952.17 | 866.32 | 843.32 | 927.16 | 956.9 | 988.36 | 927.62 | 953.64 | 793.54 |
| Modulus (Mpa) | 23.63 | 24.98 | 23.66 | 24.07 | 33.27 | 36.43 | 35.18 | 36.28 | 20.12 |
| Bonding strength of assembled parts at room temperature | | | | | | | | | |
| Stainless Steel to Glass (Mpa) | 5.27 | 5.37 | 5.39 | 5.72 | 6.91 | 6.54 | 6.38 | 6.92 | 5.45 |
| PC/ABS to Glass (Mpa) | 7.47 | 7.27 | 7.52 | 7.77 | 9.25 | 9.51 | 9.28 | 9.48 | 7.11 |
| Stainless Steel to Glass after 7 days, 85° C., 85% RH aging (Mpa) | 3.56 | 3.42 | 3.71 | 3.66 | 4.56 | 4.44 | 4.39 | 4.64 | 3.65 |
| Reworkability of assembled parts at room temperature and elevated temperature | | | | | | | | | |
| Reworkability at room temperature | Level 1 | Level 1 | Level 1 | Level 1 | Level 2 | Level 2 | Level 2 | Level 2 | Level 1 |
| Reworkability at 80° C. | Level 1 | Level 1 | Level 1 | Level 1 | Level 1 | Level 1 | Level 1 | Level 1 | Level 1 |

TABLE 2

Comparative formulations of reactive hot melt adhesive compositions (by weight %) and testing results

| | CE.1 | CE.2 | CE.3 | CE.4 | CE.5 | CE.6 | CE.7 | CE.8 | CE.9 |
|---|---|---|---|---|---|---|---|---|---|
| Component | | | | | | | | | |
| Polyester polyol 1 | 24.5 | 23.3 | 22.3 | 21.2 | 26.7 | 19.5 | 27.8 | 16.4 | 24.5 |
| Polyester polyol 2 | 19.1 | 18.1 | 17.4 | 16.5 | 20.8 | 15.2 | 21.6 | 12.8 | 19.1 |
| Polyether polyol | 25.1 | 23.8 | 22.9 | 21.7 | 27.3 | 20.0 | 28.5 | 16.8 | 25.1 |
| (Meth)acrylate polymer | 9.9 | 5.6 | 5.4 | 5.1 | 5.4 | 27.5 | 0.0 | 0.0 | 0.0 |
| Polyisocyanate | 14.8 | 13.1 | 13.5 | 13.7 | 16.1 | 12.6 | 14.6 | 9.9 | 24.7 |
| Catalyst | 0.1 | 0.1 | 0.1 | 0.1 | 0.1 | 0.1 | 0.1 | 0.1 | 0.1 |
| Diluent A-1 | 0.0 | 0.0 | 0.0 | 0.0 | 0.0 | 0.0 | 7.4 | 0.0 | 6.5 |
| Diluent A-2 | 0.0 | 0.0 | 0.0 | 0.0 | 0.0 | 0.0 | 0.0 | 4.4 | 0.0 |
| Diluent B-1 | 0.0 | 1.9 | 14.9 | 19.7 | 0.0 | 0.0 | 0.0 | 0.0 | 0.0 |
| Diluent B-2 | 0.0 | 0.0 | 0.0 | 0.0 | 3.7 | 5.2 | 0.0 | 0.0 | 0.0 |
| Thermoplastic polymer 1 | 6.5 | 14.1 | 3.5 | 2.0 | 0.0 | 0.0 | 0.0 | 0.0 | 0.0 |
| Thermoplastic polymer 2 | 0.0 | 0.0 | 0.0 | 0.0 | 0.0 | 0.0 | 0.0 | 0.0 | 0.0 |
| Thermoplastic polymer 3 | 0.0 | 0.0 | 0.0 | 0.0 | 0.0 | 0.0 | 0.0 | 39.7 | 0.0 |
| Physical properties | | | | | | | | | |
| Viscosity at 110° C. (mPas) | 6100 | 6500 | 3750 | 3100 | 3800 | 25800 | 2000 | 87500 | 1550 |
| Tensile strength (Mpa) | 10.33 | 9.88 | 4.83 | 3.45 | 5.77 | 8.64 | 5.61 | 10.15 | 8.53 |
| Elongation (%) | 896.17 | 976.32 | 319.45 | 187.51 | 783.48 | 364.84 | 783.49 | 583.2 | 382.19 |
| Modulus (Mpa) | 28.88 | 34.29 | 13.55 | 10.51 | 21.73 | 15.33 | 8.34 | 13.42 | 18.43 |
| Bonding strength of assembled parts at room temperature | | | | | | | | | |
| Stainless Steel to Glass (Mpa) | 6.28 | 6.5 | 3.88 | 2.45 | 5.19 | 3.43 | 4.65 | 5.83 | 4.21 |
| PC/ABS to Glass (Mpa) | 9.1 | 9.33 | 4.21 | 3.11 | 6.32 | 5.88 | 6.72 | 7.43 | 5.23 |
| Stainless Steel to Glass after 7 days, 85° C., 85% RH aging (Mpa) | 4.08 | 4.35 | 1.35 | 0.83 | 3.06 | 2.18 | 3.62 | 2.84 | 2.78 |
| Reworkability of assembled parts at room temperature and elevated temperature | | | | | | | | | |
| Reworkability at room temperature | Level 3 | Level 3 | Level 1 | Level 1 | Level 3 | Level 2 | Level 1 | Level 1 | Level 3 |
| Reworkability at 80° C. | Level 1 | Level 1 | Level 1 | Level 1 | Level 1 | Level 1 | Level 1 | Level 1 | Level 2 |

The testing results of inventive and comparative examples were shown in Tables 1 and 2, respectively.

As shown in Table 1, all inventive examples surprisingly exhibited an excellent reworkability (Level 1 or Level 2) of assembled parts at room temperature and elevated temperature. Meanwhile, the prepolymer compositions of the inventive examples possessed a suitable viscosity range for application under working temperature. Also shown in Table 1 is an excellent mechanical strength profile including tensile strength, elongation and modulus, as well as bonding strength under room temperature and aging conditions for the cured adhesive products prepared by the inventive examples. The mechanical strength profile ensured that such cured adhesive products possessed a good cohesive strength which may result in less residuals and better reworkability after the assembly was detached by force.

Comparing to the excellent performance profile achieved by inventive examples, as shown in Table 2, CEs.1 and 2 containing no diluent or less diluent used in the present invention exhibited a poor reworkability at room temperature. Although the reworkability at room temperature and elevated temperature was acceptable for CEs.3 and 4, the mechanical strength and bonding strength were significantly lower than those shown in inventive examples due to the excess amount of diluent. CE.5 demonstrated that the reworkability would be negatively affected if a higher amount of polyols were used. CE.6 show that the prepolymer composition were too viscous to be applied and spread on the substrates as the amount of (meth)acrylate polymer was used in a higher amount. It was confirmed in CE.7 that if the (meth)acrylate polymer was not contained, the viscosity would be relatively lower so that the adhesive on the substrate was easier to flow and difficult to be applied in place. As shown in CE.8, if the amount of the polyols and (meth)acrylate polymer were too low, a highly viscous adhesive having a poor dispensability would be obtained. CE.9 demonstrated that the assembly parts were not easily reworkable in the presence of a high amount of polyisocyanate and absence of (meth)acrylate polymer.

What is claimed is:

1. A reactive hot melt adhesive composition prepared from a mixture comprising:
   10% to 24% by weight of a polyisocyanate,
   40% to 73% by weight of a first polyol having a number average molecular weight of 1,500 to 10,000 g/mol,
   1% to 25% by weight of a (meth)acrylate polymer having a hydroxyl group and having a number average molecular weight of 20,000 to 80,000 g/mol, and
   1% to 15% by weight of a diluent, which is a liquid (meth)acrylate oligomer having a number average molecular weight of 1,000 to 15,000 g/mol,
   in which the weight percentages are based on the total weight of all components of the composition.

2. The reactive hot melt adhesive composition according to claim 1, wherein the polyisocyanate is selected from the group consisting of diphenyl methane-4,4'-diisocyanate, isophorone diisocyanate, 1,6-hexamethylene diisocyanate, toluene diisocyanate and combinations thereof.

3. The reactive hot melt adhesive composition according to claim 1, wherein the polyisocyanate is present in an amount of 12% to 20% by weight based on the total weight of all components of the composition.

4. The reactive hot melt adhesive composition according to claim 1, wherein the first polyol is selected from the group consisting of a polyester polyol, a polyether polyol and mixtures thereof.

5. The reactive hot melt adhesive composition according to claim 1, wherein the first polyol has a number average molecular weight larger than 2,000 g/mol.

6. The reactive hot melt adhesive composition according to claim 1, wherein the first polyol is present in an amount of 50% to 70% by weight based on the total weight of all components of the composition.

7. The reactive hot melt adhesive composition according to claim 1, wherein the (meth)acrylate polymer is a reaction product of a monomer selected from the group consisting of methyl (meth)acrylate, ethyl (meth)acrylate, n-propyl (meth)acrylate, iso-propyl (meth)acrylate, n-butyl (meth)acrylate, isobutyl (meth)acrylate, n-hexyl(meth)acrylate, n-octyl(meth)acrylate 2-ethylhexyl (meth)acrylate, dodecyl (meth)acrylate, cyclohexyl (meth)acrylate, norbornyl(meth)acrylate and combinations thereof.

8. The reactive hot melt adhesive composition according to claim 1, wherein the (meth)acrylate polymer has a number average molecular weight of from 25,000 g/mol to 60,000 g/mol.

9. The reactive hot melt adhesive composition according to claim 1, wherein the (meth)acrylate polymer is present in an amount of 2% to 20% by weight based on the total weight of all components of the composition.

10. The reactive hot melt adhesive composition according to claim 1, wherein the diluent further comprises a second polyol having a number average molecular weight of no larger than 1,200 g/mol.

11. The reactive hot melt adhesive composition according to claim 1, wherein the (meth)acrylate oligomer diluent has a glass transition temperature of no greater than 0° C.

12. The reactive hot melt adhesive composition according to claim 1, wherein the (meth)acrylate oligomer diluent has number average molecular weight of from 1,500 to 10,000 g/mol.

13. The reactive hot melt adhesive composition according to claim 1, wherein:
   the diluent further comprises a second polyol having a number average molecular weight of no larger than 1,200 g/mol and
   the second polyol is a natural oil based polyol.

14. The reactive hot melt adhesive composition according to claim 13, wherein the natural oil based polyol is selected from the group consisting of a castor oil based polyol, a dimer fatty acid based polyol, and a combination thereof.

15. The reactive hot melt adhesive composition according to claim 13, wherein the second polyol has a number average molecular weight from 500 to 1,200 g/mol.

16. The reactive hot melt adhesive composition according to claim 13, wherein the natural oil based polyol is a castor oil based polyol having a hydroxyl value of 50 to 400 mg KOH/g.

17. The reactive hot melt adhesive composition according to claim 13, wherein the natural oil based polyol is a castor oil based polyol having a viscosity of 100 to 2,000 cPs at 25° C.

18. The reactive hot melt adhesive composition according to claim 13, wherein the natural oil based polyol is a dimer fatty acid based polyol having a hydroxyl value of 20 to 200 mg KOH/g.

19. The reactive hot melt adhesive composition according to claim 1, wherein the diluent is present in an amount of 2% to 12% by weight based on the total weight of all components of the composition.

20. The reactive hot melt adhesive composition according to claim 1, optionally comprising an additive selected from the group consisting of thermoplastic polymer, plasticizer, filler, pigment, curing catalyst, dissociation catalyst, antioxidant, flow modifier, dyestuff, flame retardant, inhibitor, UV absorber, adhesion promoter, stabilizer, tackifier, wax and a combination thereof.

21. The reactive hot melt adhesive composition according to claim 1, further comprising a thermoplastic polymer selected from the group consisting of polyurethane, homopolymer or random copolymer of (meth)acrylic acid, vinyl ester, vinyl ether, styrene, acrylamide, (meth)acrylamide, fumarate, maleate, acrylonitrile, ethylene, propylene and derivatives thereof.

22. A polyurethane prepolymer composition comprising the reaction product of the reactive hot melt adhesive composition according to claim 1.

23. A method of bonding materials together which comprises:
   providing the reactive hot melt adhesive composition of claim 1 in solid form;
   heating the reactive hot melt adhesive composition to a liquid form;
   applying the reactive hot melt adhesive composition in liquid form to a first substrate,
   bringing a second substrate in contact with the reactive hot melt adhesive composition applied to the first substrate,
   cooling the reactive hot melt adhesive composition disposed between the first and second substrates to a solid form, and
   subjecting the cooled reactive hot melt adhesive composition to moisture which will allow the reactive hot melt adhesive composition to cure.

24. The method of claim 23 wherein the first and second substrates are independently comprised of wood, metal, polymer, plastic, glass, textile, footwear component, glazing component, door panel, architectural panel, handheld device component and display component.

25. Cured reaction products of the reactive hot melt adhesive composition according to claim 1.

* * * * *

UNITED STATES PATENT AND TRADEMARK OFFICE
CERTIFICATE OF CORRECTION

PATENT NO. : 11,530,344 B2
APPLICATION NO. : 16/405179
DATED : December 20, 2022
INVENTOR(S) : Dan Xie et al.

It is certified that error appears in the above-identified patent and that said Letters Patent is hereby corrected as shown below:

In the Specification

Column 3, Line 28 change "tolidene disiocyanate (TODD" to --tolidene disiocyanate (TODI)--.
Column 5, Line 33 change "Ci to $C_{12}$" to --$C_1$ to $C_{12}$--.

Signed and Sealed this
Thirteenth Day of August, 2024

Katherine Kelly Vidal
*Director of the United States Patent and Trademark Office*